United States Patent [19]

Artemiev et al.

[11] 4,149,087
[45] Apr. 10, 1979

[54] DRUM OF STORING FUEL ASSEMBLIES OF NUCLEAR REACTOR

[76] Inventors: Lev N. Artemiev, ulitsa Berezovskaya 89, kv. 94; Vladimir I. Batjukov, ulitsa Prygunova, 9, kv. 29; Alexandr I. Fadeev, ulitsa Engelsa, 21, kv. 46, all of Gorky, U.S.S.R.

[21] Appl. No.: 796,603

[22] Filed: May 13, 1977

[51] Int. Cl.² ............................................. G21F 5/00
[52] U.S. Cl. .................................... 250/507; 250/498
[58] Field of Search ............... 250/506, 507, 498, 497; 176/30, 87, 27

[56] References Cited

U.S. PATENT DOCUMENTS

| 3,038,999 | 6/1962 | Loos et al. | 250/507 |
| 3,147,383 | 9/1964 | Prest | 250/497 |
| 3,483,380 | 12/1969 | Antonsen et al. | 250/507 |

Primary Examiner—Bruce C. Anderson
Attorney, Agent, or Firm—Fleit & Jacobson

[57] ABSTRACT

The proposed drum for storing fuel assemblies of a nuclear reactor comprises a holder rotatable around its axis and provided with tubular sockets arranged in concentric rows along the circumference of the holder so that the axis of at least one socket of each row intersects the trajectory described by the grip of the recharging mechanism in the course of its movement. The proposed drum design makes it possible to facilitate and speed up the process of recharging fuel assemblies.

4 Claims, 3 Drawing Figures

DRUM OF STORING FUEL ASSEMBLIES OF NUCLEAR REACTOR

The present invention relates to equipment for recharging of nuclear reactors and, more particularly, to a drum for storing fuel assemblies of a nuclear reactor.

The proposed drum for storing fuel assemblies can be used for short-term storage of both new and spent fuel assemblies in the course of recharging a nuclear reactor, which process consists in replacing used fuel assemblies by new ones and transporting the spent assemblies to washing means with the aid of recharging mechanisms arranged in recharging and washing boxes.

There is known a drum for storing fuel assemblies, comprising a holder which is rotatable around its axis. The holder is provided with tubular sockets to receive fuel assemblies. The sockets are arranged in a number of rows which are concentric with the circumference of the holder.

The drum's inner space communicates with that of the recharging box through a recharging channel which comprises a plurality of pipes whose axes coincide with those of the sockets. The number of pipes is equal to that of the sockets provided in the holder.

Fuel assemblies are transported from the drum to the recharging box with the aid of a recharging mechanism arranged in the recharging box. The holder is turned about its axis so that the axis of a socket is matched with that of the recharging channel's pipe. The recharging mechanism is adjusted in advance for the recharging channel's pipe of one row, and the gripping means of this mechanism withdraws the fuel assemblies from the sockets. In order to extract a fuel assembly from its socket and insert a new one, the drum's holder must be turned through a certain angle until the axis of the socket is matched with that of the recharging channel's pipe through which the inside of the drum communicates with the box, whereto fuel assemblies are transported.

After the fuel assemblies of one row have been removed from the drum, the recharging mechanism is adjusted for another pipe of the recharging channel, which also applies to the drum charging process. When all the sockets of a row have been filled, the recharging mechanism is adjusted for another pipe of the recharging channel.

The drum under review is constructed so that in the course of recharging, each socket of the drum must be brought to the recharging channel's pipe, which necessitates multiple turns of the drum's holder and complicates the recharging process. Besides, every now and then, the recharging mechanism must be set in motion or adjusted for a certain pipe of the recharging channel, whereas the joint between the recharging mechanism and the recharging channel's pipe must be hermetically sealed. All these factors account for a prolonged recharging process.

It is an object of the present invention to simplify the process of recharging the nuclear reactor drum.

It is another object of the invention to speed up the recharging process.

It is still another object of the invention to raise the operational reliability of the drum.

The foregoing objects are attained by providing a drum for storing fuel assemblies of a nuclear reactor, comprising a holder which is rotatable around its axis and provided with tubular sockets arranged in a number of rows concentrically with the circumference of the holder, said sockets being intended to receive fuel assemblies to be installed there with the aid of a recharging mechanism through pipes of a recharging channel, which are arranged coaxially with the sockets, opposite one socket in each row, in which drum the rows of sockets are so arranged in the holder, in accordance with the invention, that the axis of at least one socket in each row intersects with the trajectory described by a grip of the recharging mechanism in the course of its movement, whereas the pipes of the recharging mechanism are arranged opposite the intersection points.

The foregoing arrangement of sockets in the drum's holder makes it possible to simplify and speed up the recharging process and raise the operational reliability of the drum.

Other objects and advantages of the present invention will become more apparent from the following detailed description of preferred embodiments thereof taken in conjunction with the accompanying drawings, wherein.

Figure 1:
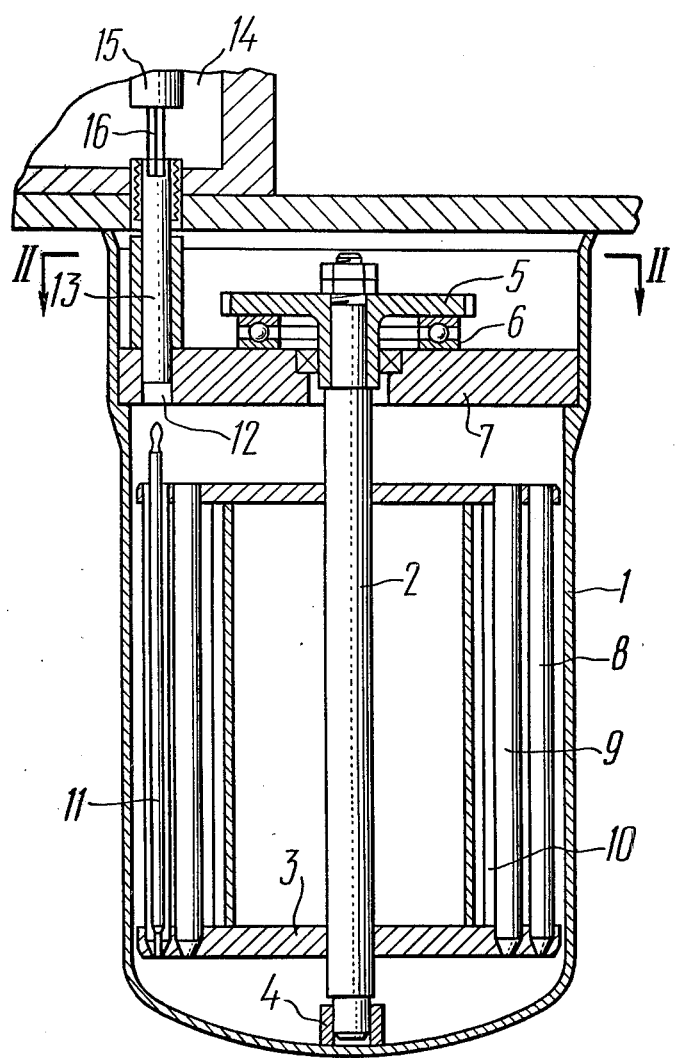
FIG. 1 is a general elevation view of a drum for storing fuel assemblies, in accordance with the invention.

Referring now to the accompanying drawings, a drum body 1 (FIG. 1) contains an axle 2, whereupon there is mounted a holder 3 rotatable about its axis. For this purpose, the lower end of the axle 2 is made rotatable in a bushing 4, whereas the upper end is rigidly coupled to a gear 5 which abuts through a bearing 6 against a lid 7. In the holder 3 there are provided sockets 8, 9 and 10 made as vertical bores to receive rod-type fuel assemblies 11.

The lid 7 has openings 12 through which extend pipes 13 of a recharging channel which communicates the inside of the drum with that of a box 14 housing a recharging mechanism 15 with a grip 16.

Figure 2:
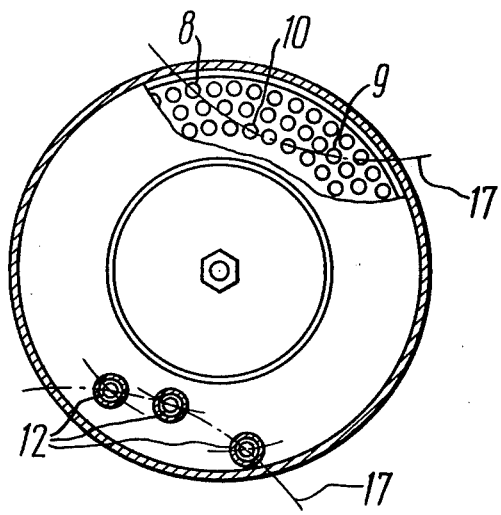
FIG. 2 is a section taken on line II—II of FIG. 1 to illustrate the arrangement of sockets in the holder, in accordance with the invention.

The sockets 8, 9 and 10 (FIG. 2) are arranged in three concentric rows along the circumference of the holder 3. There are sixty nine sockets in each row. The sockets 8, 9 and 10 are so arranged in the holder 3 that the axes of three sockets 8, 9 and 10 of different rows are all inside a circle 17 whose center is outside the drum.

The circle 17 is the trajectory described by the grip 16 of the recharging mechanism 15.

The openings 12 in the lid 7 are located at points where the trajectory described by the grip 16 intersects with the axis of three sockets 8, 9 and 10 of different rows.

Figure 3:
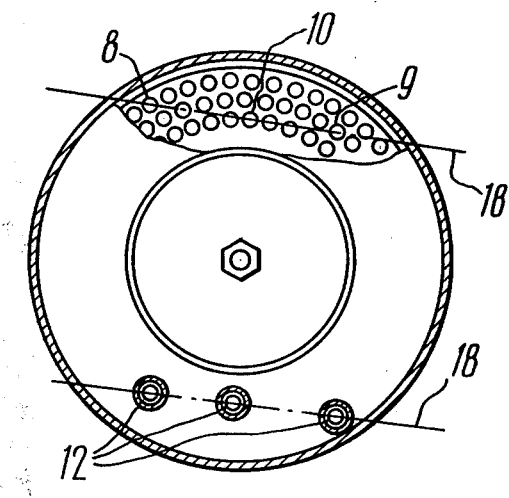
FIG. 3 is a plan sectional view of an alternative arrangement of sockets in the holder, in accordance with the invention.

FIG. 3 shows an alternative arrangement of the sockets 8, 9 and 10 in the holder 3. The axes of the three sockets 8, 9 and 10 are all on a direct line 18 which is the trajectory described by the grip 16 of the recharging mechanism 15.

The proposed drum for storing fuel assemblies of a nuclear reactor is charged as follows.

The drum's drive (not shown) rotates the holder 3 through the gear 5 until the axes of the socket 8, 9 and 10 are matched with those of the pipes 13 of the recharging channel.

The grip 16 of the recharging mechanism 15 arranged in the box 14 starts moving along the trajectory 17 (describing a circle), which trajectory 17 intersects with the axis of the sockets 8, 9 and 10 toward the pipe 13 of the recharging channel, which is opposite the first socket 8 of the holder 3. The grip 16, which holds a fuel assembly 11, inserts the latter through the pipe 13 and the opening 12 into the socket 8 of the holder 3.

The grip 16 of the recharging mechanism 15 is then lifted into the box 14, grips the next fuel assembly 11 and likewise installs it in the socket 9 of the holder 3. Then the recharging mechanism 15 puts the third fuel assembly in the socket 10. As the fuel assemblies 11 are being placed in the sockets 8, 9 and 10, the holder 3 remains stationary.

Following the insertion of the three fuel assemblies into the sockets 8, 9 and 10, the holder 3 is turned so that the tenth sockets 8, 9 and 10 (counting from the filled sockets) come under the openings 12. These sockets are filled as described above.

Thus, following each turn of the holder 3, each tenth socket 8, 9 and 10 (counting from the last filled socket) comes under the opening 12. After a full turn of the holder 3, under the opening 12 there come the sockets 8, 9 and 10 which are adjacent to those which were filled first. Thus fuel assemblies 11 are inserted into all the sockets 8, 9 and 10 of the holder 3.

During a removal of the fuel assemblies 11 from the drum to the box 14, the sequence of events is reversed.

The proposed design of a drum for storing fuel assemblies of a nuclear reactor makes it possible to place the fuel assemblies 11 in the sockets 8, 9 and 10 of the holder 3 through the pipes 13 of the recharging channel, without additionally turning the holder 3, which prolongs the life of the drum due to reduced wear of friction parts and simplifies the holder drive. The invention provides for spaced arrangement if the sockets 8, 9 and 10, containing the fuel assemblies 11, in the holder 3, which prevents overrunning and jamming of said holder 3 and cuts down the recharging time.

What is claimed is:

1. A recharging device for a nuclear reactor including a drum, a recharging box having a recharging mechanism and a recharging channel for connecting the drum to the recharging box, said recharging device comprising:

a drum body;
a holder pivotably mounted in said drum body and rotatable about a holder axis;
stationary axial tubular sockets arranged in said holder in a number of rows, concentrically with the axis of the holder for receiving fuel assemblies;
a recharging channel having pipes for recharging fuel assemblies abutting said drum body and arranged coaxially with said tubular sockets over one socket in each row;
a recharging box;
means for connecting the recharging box to said drum body so that the box communicates with said drum body through said pipes of said recharging channel, the recharging box including a recharging mechanism arranged in said recharging box for recharging of fuel assemblies and having a grip for holding fuel assemblies during recharging, the grip being movable to described a trajectory;
said tubular sockets being so arranged in rows in said holder that the axis of at least one of said sockets in each row intersects with the trajectory described by said grip of said recharging mechanism in the course of its movement;
said pipes of said recharging channel, abutting said drum body at points of intersection between a socket axis and a point on the trajectory described by said grip of said recharging mechanism; and
means for rotating said holder to position different tubular sockets in alignment with said pipes.

2. A recharging device as claimed in claim 1 wherein three rows of tubular sockets are concentrically arranged within said holder.

3. A recharging device as claimed in claim 2 wherein the grip describes a straight trajectory and wherein the pipes of the recharging channel are aligned in a straight line.

4. A recharging device as claimed in claim 2 wherein the grip of the recharging mechanism describes an arcuate-shape trajectory and wherein the pipes of the recharging channel are aligned with points on the arcuate-shaped trajectory.

* * * * *